US005851268A

United States Patent [19]

Hyodo et al.

[11] Patent Number: 5,851,268

[45] Date of Patent: Dec. 22, 1998

[54] CANISTER

[75] Inventors: Yoshihiko Hyodo, Susono; Takaaki Itoh, Mishima, both of Japan

[73] Assignee: Toyota Jidosha Kabushiki Kaisha, Aichi, Japan

[21] Appl. No.: 803,057

[22] Filed: Feb. 19, 1997

[30] Foreign Application Priority Data

Feb. 20, 1996 [JP] Japan .................................... 8-032116

[51] Int. Cl.[6] ........................................ B01D 53/04

[52] U.S. Cl. ................................ 96/131; 96/139; 96/149; 96/152; 123/519

[58] Field of Search ............................ 96/108, 131–133, 96/139, 149, 152; 123/519

[56] References Cited

U.S. PATENT DOCUMENTS

| | | | |
|---|---|---|---|
| 2,325,657 | 8/1943 | Burkness | 96/132 X |
| 3,169,112 | 2/1965 | Nelson | 96/131 X |
| 3,313,309 | 4/1967 | Wang | 96/131 X |
| 3,464,186 | 9/1969 | Hankison et al. | 96/139 X |
| 3,683,597 | 8/1972 | Beveridge et al. | 55/316 |
| 3,730,158 | 5/1973 | St. Amand | 123/136 |
| 4,306,894 | 12/1981 | Fukami et al. | 55/316 |
| 4,430,099 | 2/1984 | Yanagisawa et al. | 55/316 |
| 5,002,596 | 3/1991 | Moskaitis et al. | 96/152 |
| 5,304,235 | 4/1994 | Watanabe et al. | 123/519 X |
| 5,393,329 | 2/1995 | Inagaki et al. | 96/131 |
| 5,408,976 | 4/1995 | Reddy | 123/519 |
| 5,456,236 | 10/1995 | Wakashiro et al. | 123/519 |
| 5,538,543 | 7/1996 | Watanabe et al. | 96/131 |
| 5,538,842 | 7/1996 | Watanabe et al. | 96/131 |
| 5,564,398 | 10/1996 | Maeda et al. | 123/519 X |
| 5,634,450 | 6/1997 | Hara et al. | 123/519 |
| 5,645,036 | 7/1997 | Matsumoto et al. | 123/519 |

FOREIGN PATENT DOCUMENTS

| | | | |
|---|---|---|---|
| 0514961 | 11/1992 | European Pat. Off. . | |
| 0674563 | 4/1939 | Germany | 96/139 |
| 63-128258U | 8/1988 | Japan . | |
| 01-015118 | 1/1989 | Japan | 96/152 |
| 06-074107A | 3/1994 | Japan . | |
| 06-280693A | 10/1994 | Japan . | |
| 07-139441A | 5/1995 | Japan . | |

*Primary Examiner*—Robert Spitzer
*Attorney, Agent, or Firm*—Kenyon & Kenyon

[57] ABSTRACT

According to the present invention, there is provided a canister comprising: a casing having an interior therein and a separator for separating the interior into first and second interior sections, the first interior section containing an absorbent and having a fuel vapor inlet and a fuel vapor outlet, the second interior section containing an absorbent and having an opening which is open to the outside air, the separator having fuel vapor channels therein and being formed by compressing a flexible filtering material to elongate the channels.

6 Claims, 5 Drawing Sheets

CANISTER

BACKGROUND OF THE INVENTION

1. Field of the Invention

The invention relates to a canister, and in particular, a charcoal canister for an internal combustion engine.

2. Description of the Related Art

It is necessary to allow an interior of a fuel tank to communicate with the outside air since an increased internal pressure of the fuel tank during fuel supply restricts the operation of the fuel supply. On the other hand, a dispersion of fuel vapor, produced during the fuel supply operation, into the outside air leads to an environmental problem. In order to overcome the problem, the fuel tank communicates with the outside air via a charcoal canister which absorbs fuel vapor produced in the fuel tank. The canister has a fuel vapor inlet which communicates with the fuel tank, a fuel vapor outlet which communicates with the engine, and an opening which is open to the outside air.

During the operation of the engine, the fuel vapor absorbed in the canister is purged via the fuel vapor outlet to the engine to restore the ability to absorb fuel vapor from the fuel tank.

When the engine is stopped, the fuel vapor absorbed in the canister diffuses in the canister toward the opening and, eventually, disperses into the outside air. Therefore, it is necessary to provide a canister having longer diffusing distance or time for fuel vapor in the canister without increasing the volume of the canister.

The Japanese Unexamined Patent Publication (Kokai) No. 7-139441 discloses a canister provided with a separator for separating the interior of the canister into two interior sections each of which contains activated carbon. The separator has upper and lower walls and an interior formed between the walls. Each wall has an opening which allows the interior section of the canister to communicate with the interior of the separator. The interior of the separator is divided by ribs to form a passageway which has a complicated route so as to obtain a longer diffusing distance for fuel vapor in the canister. The passageway connects the openings of the walls with each other.

According to the above described canister, the portion of the activated carbon adjacent the opening of the separator is more heavily used since the wall has a single small opening. Therefore, this portion of the activated carbon fails earlier than the remaining portion of the activated carbon. On the other hand, by producing an elongated passageway using ribs, it is almost impossible to provide a separator meeting all requirements, i.e., the provision of openings evenly provided on the walls, the provision of a passageway having a complicated route to each opening, and low pressure loss across the separator.

SUMMARY OF THE INVENTION

Accordingly, the object of the invention is to provide a canister meeting all the requirements of a provision of openings evenly provided on the walls, a provision of an elongated passageway for fuel vapor to each opening, and a low pressure loss across the separator.

According to the present invention, there is provided a canister comprising: a casing having an interior therein and a separator for separating the interior to first and second interior sections, the first interior section having an absorbent, a fuel vapor inlet and a fuel vapor outlet, the second interior section having an absorbent and an opening which is open to the outside air, the separator having fuel vapor channels therein and being formed by compressing a flexible filtering material to elongate the lengths of the channels.

The present invention may be more fully understood from the description of the preferred embodiments of the invention set forth below, together with the accompanying drawings.

DESCRIPTION OF THE PREFERRED EMBODIMENTS

Figure 1:
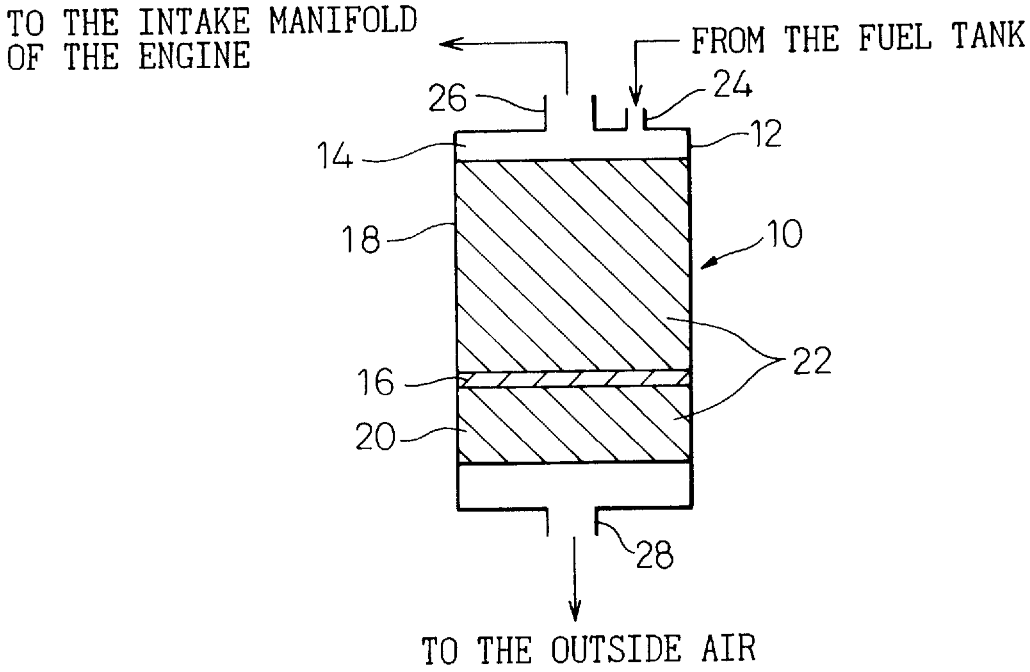
FIG. 1 is a cross sectional view of the first embodiment of a canister of the invention using a compressed filter.

FIG. 1 is a cross sectional view of a charcoal canister 10 of the invention. The canister 10 comprises a casing 12 having an interior 14 therein. A filter or separator 16 having air permeability is positioned in the casing 12 to divide the interior 14 into first and second interior sections 18 and 20. As described below, the filter 16 functions as means for preventing fuel vapor from being diffused between the interior sections 18 and 20. The interior sections 18 and 20 are filled with absorbent or activated carbon 22. The first interior section 18 has a fuel vapor inlet 24 to allow the first interior section 18 to communicate with a fuel tank (not shown), and a fuel vapor outlet 26 to allow the first interior section 18 to communicate with an intake manifold of an engine (not shown). The second interior section 20 has an opening 28 which is open to the outside air. The interior sections 18 and 20 communicate with each other via the filter 16.

Figure 2:
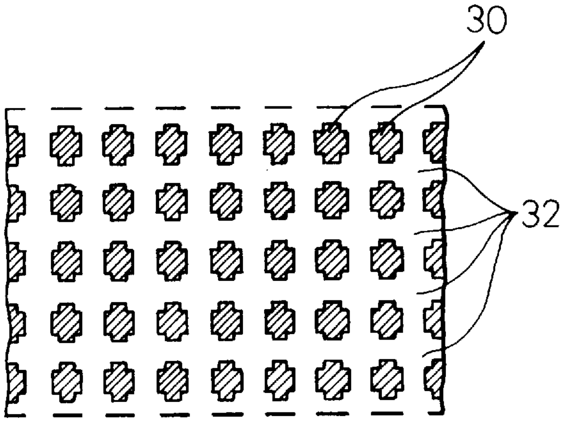
FIG. 2 is a schematic view of an internal structure of an uncompressed filter.
Figure 3:
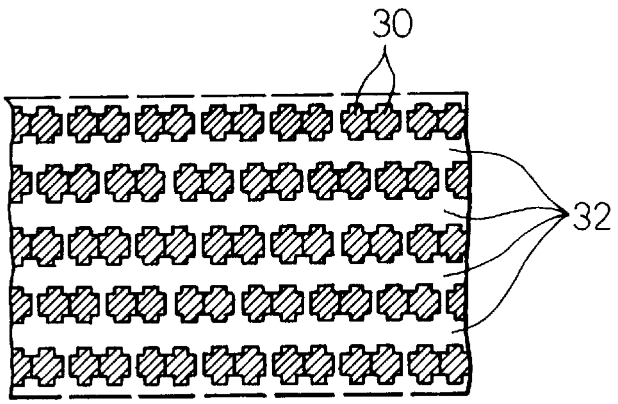
FIG. 3 is a schematic view of an internal structure of a compressed filter according to the invention.

The filter 16 is formed by compressing a flexible filtering material, for example, non-woven fabric which is commonly used as a filtering material in the prior art. FIG. 2 shows a schematic view of an internal structure of non-woven fabric which is not compressed. FIG. 3 shows a schematic view of an internal structure of non-woven fabric which is transversely compressed. The non-woven fabric is comprised of fibers 30 and has porous structure having pores or channels 32. It will be understood on comparing FIG. 3 with FIG. 2, that the density of the fibers 30 per volume or thickness of the compressed filter 16 comprised of the compressed non-woven fabric is increased to elongate the channels 32. Therefore, a diffusing distance for fuel vapor passing through the compressed filter 16 per thickness of the compressed filter 16 is longer than that of the uncompressed filter. Thus, a decreased amount of fuel is diffused from the activated carbon 12 of the first interior section 18 to the activated carbon 12 of the second interior section 20 via the compressed filter 16 for a predetermined period, and consequently, a decreased amount of fuel is dispersed to the outside air for the predetermined period. It should be understood that the activated carbon adjacent to the compressed filter 16 will be evenly used since openings of the channels 32 are evenly distributed on upper and lower faces of the compressed filter 16, and therefore, any localized failure of the activated carbon is prevented. It should be also understood that the non-woven fabric may be compressed in any direction to obtain the effect described above.

Figure 4:
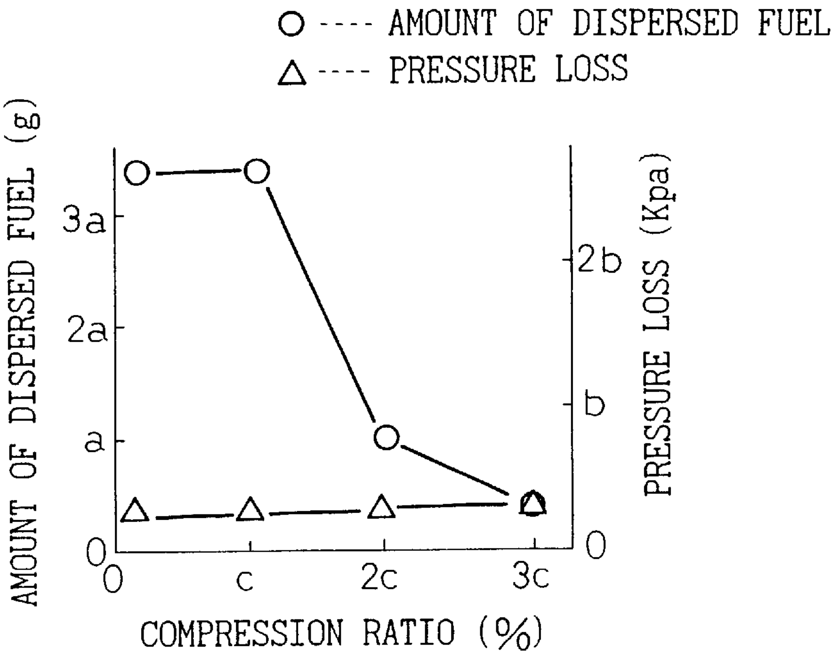
FIG. 4 is a graph showing a relationship between a compression ratio of the compressed filter and an amount of fuel dispersed to the outside air for a predetermined period, and a relationship between a compression ratio of a compressed filter and pressure loss due to the compressed filter.

In FIG. 4, a relationship between a compression ratio (%) of the compressed filter 16 and an amount (g) of fuel dispersed to the outside air for a predetermined period is shown. The compression ratio is the ratio of the volume of the compressed filter 16 to the volume of the uncompressed filter. The compressing direction of the compressed filter 16 is not limited. It will be understood from FIG. 4 that the amount of the dispersed fuel is decreased to one-third as the compression ratio is increased from 0% to 3 c % to elongate the length of the channels 32. It should be noted that "c" is defined as the compression ratio at which the amount of fuel dispersed to the outside air starts to decrease from the amount of dispersed fuel at a compression ratio of 0%.

In FIG. 4, the relationship between a compression ratio (%) of the compressed filter 16 and the pressure loss (Kpa) due to the compressed filter 16 is also shown. The pressure loss is increased when a large amount of fuel vapor must pass through the filter. However, in this embodiment, the pressure loss is not substantially increased as the compression ratio of the filter 16 is increased to 3 c % since the rate of fuel vapor passing through the filter is low in the case of the canister 10 of the invention. Further, the pressure loss due to the filter 16 is small since the pressure loss due to the activated carbon 22 is much greater than that due to the filter 16. The maximum compression ratio of the filter comprised of a commonly used filtering material, to prevent an increase in the pressure loss due to the filter, is about 50%.

Figure 5A:
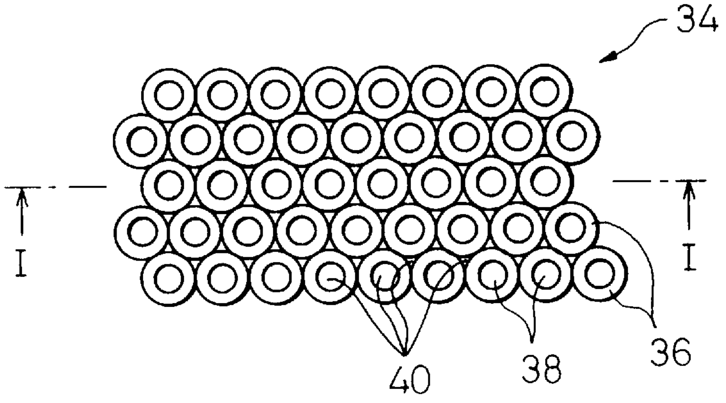
FIG. 5*a* is a plan view of the second embodiment of a canister of the invention using a compressed filter comprised of hollow fibers.
Figure 5B:
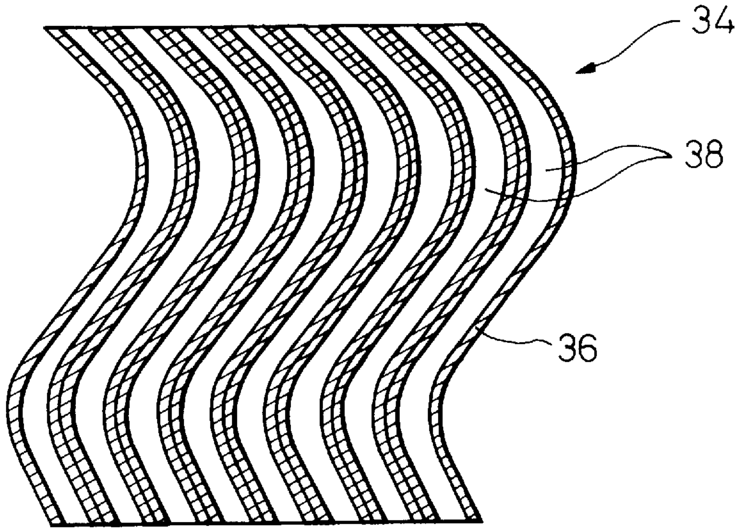
FIG. 5*b* is a cross sectional view taken along line A—A of FIG. 5*a;*
Figure 6A:
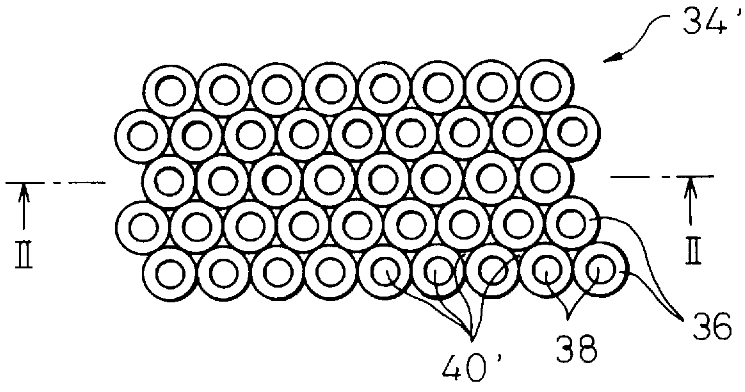
FIG. 6*a* is a plan view of a filter comprised of hollow fibers.
Figure 6B:
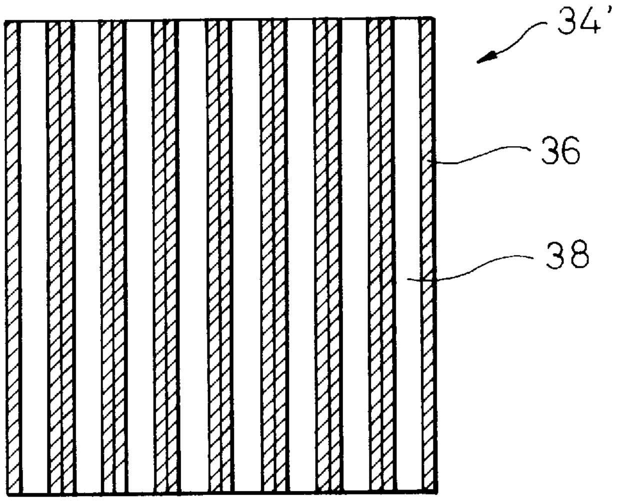
FIG. 6*b* is a cross sectional view taken along line B—B of FIG. 6*a;*

In FIGS. 5*a* and 5*b*, a filter 34 used in the second embodiment of the canister 10 of the invention is shown. The filter 34 is comprised of hollow fibers 36. Each of the hollow fibers 36 has a channel 38 which extends therethrough in the longitudinal direction thereof. The filter 34 is formed by positioning the hollow fibers 36 to extend in the direction parallel to the thickness of the filter 34, compressing the hollow fibers 36 in the direction parallel to the thickness of the filter 34 or in the longitudinal direction of the hollow fiber, and connecting the hollow fibers 36 to each other. Passageways 40 formed by the channels 38 of the hollow fiber 36 and the spaces between the hollow fibers 36 allow the activated carbons 12 to communicate with each other. It may be understood from FIGS. 6*a* and 6*b* showing a filter 34' comprised of uncompressed hollow fibers that a diffusing distance of the passageways 40 of the compressed filter 34 for vapor fuel is longer than that of the uncompressed filter 34' with the same thicknesses of the filters. The pressure loss due to the compressed filter 34 is substantially the same as that due to the uncompressed filter 34' since the volume of the passageways 40 of the compressed filter 34 is substantially the same as that of the uncompressed filter 34'.

According to the invention, the filter having the elongated channels 38 or passageways 40 can be made more easily than the prior filter described above. Further, the activated carbons 22 adjacent to the filter 34 are evenly used since the openings of the channels 38 are evenly distributed on upper and lower faces of the filter 34.

Figure 7:
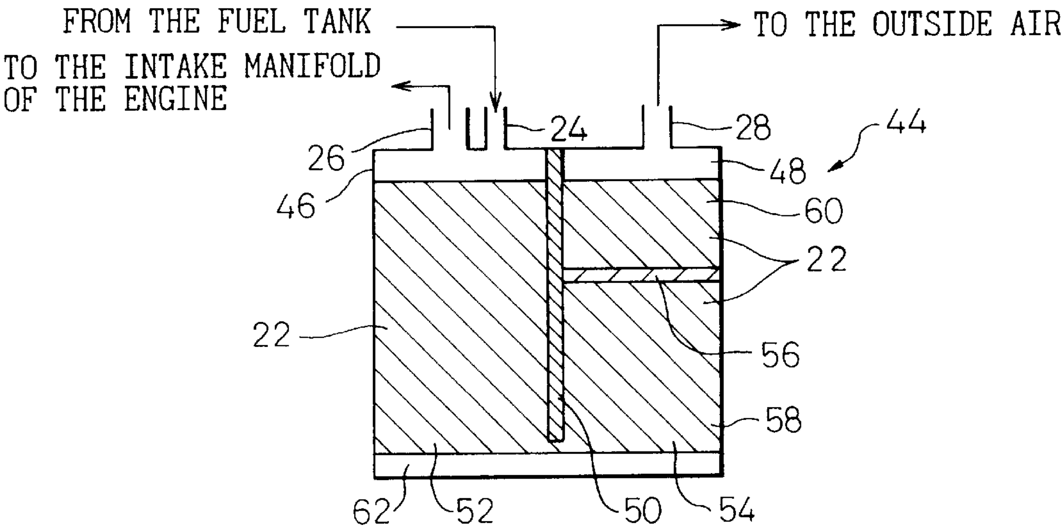
FIG. 7 is a cross sectional view of the third embodiment of a canister of the invention using a compressed filter.

In FIG. 7, the canister 44 of the third embodiment of the invention is shown. The canister 44 has a casing 46 having an interior 48 therein. A separator 50 having no air permeability is positioned in the casing 46 to divide the interior 48 into first and second interior sections 52 and 54, and further, a filter or separator 56 having air permeability is positioned in the casing 46 to divide the second interior section 54 into third and fourth interior sections 58 and 60. The filter 56 functions as means for preventing fuel vapor from diffusing between the third and fourth interior sections 58 and 60. The interior sections 52, 58 and 60 are filled with absorbent or activated carbon 22. The first interior section 52 has a fuel vapor inlet 24 to allow the first interior section 52 to communicate with a fuel tank (not shown), and a fuel vapor outlet 26 to allow the first interior section 52 to communicate with an intake manifold of an engine (not shown). The fourth interior section 60 has an opening 28 which is open to the outside air. In this embodiment, the fuel vapor inlet and outlet 24 and 26 and the opening 28 are provided on the same face of the casing 46 of the canister 44. The third and fourth interior sections 58 and 60 communicate with each other via the filter 50. The third interior section 58 communicates with the first interior section 52 via a communication space 62 which is positioned opposite to the fuel vapor inlet and outlet 24 and 26 and the opening 28. The first and third interior sections 52 and 58 of this embodiment correspond to the first interior section 18 of the first embodiment, and the fourth interior section 60 of this embodiment corresponds to the second interior section 20 of the first embodiment.

According to this embodiment, it is easy to connect the fuel vapor inlet 24 to the fuel tank, the fuel vapor outlet 26 to the intake manifold of the engine, and the opening 28 to, for example, a tube which is open to the outside air since the fuel vapor inlet and outlet 24 and 26 and the opening 28 are on the same face of the casing 46 of the canister 44.

Figure 8:
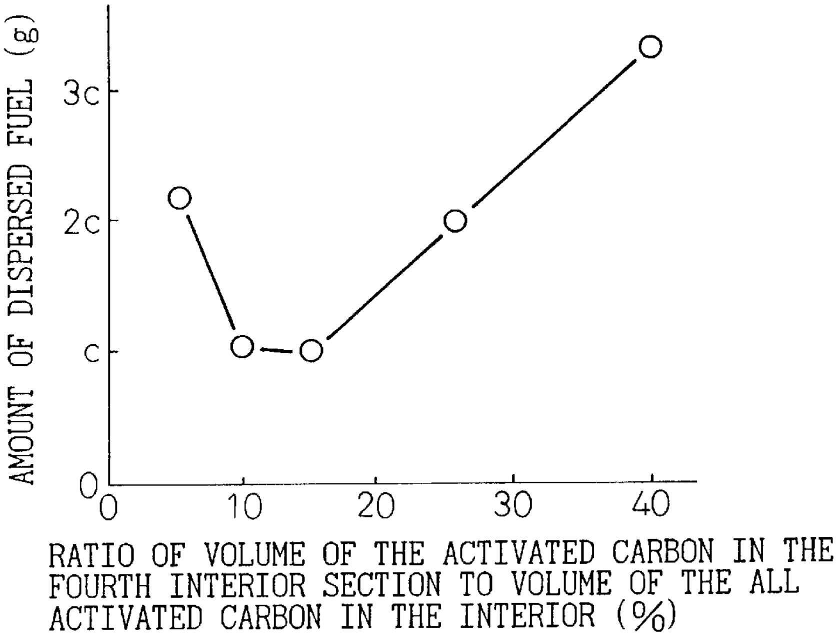
FIG. 8 is a graph showing a relationship between a ratio of a volume of the activated carbon of a fourth interior section to a volume of all the activated carbon in the interior of the canister and an amount of fuel dispersed to the outside air for a predetermined period.

According to this embodiment, the filtering feature of the canister 44 depends on the ratio of volumes between the interior sections thereof. FIG. 8 shows the relationship between the ratio (%) of volume of the activated carbon 22 in the fourth interior section 60 to the volume of all the activated carbons 22 in the interior 48 and an amount (g) of fuel dispersed to the outside air for a predetermined period including the operating and stopped periods of the engine. The amount of the dispersed fuel corresponds to a total of an amount of the dispersed fuel before and after purging fuel absorbed in the activated carbon 22 of the fourth interior section 60. The larger the volume of the fourth interior section 60 is, the less the amount of the dispersed fuel before purging is. On the other hand, the larger the volume of the fourth interior section 60 is, the larger the amount of the fuel remaining in the fourth interior section 60 after purging is, and therefore, the larger the amount of the dispersed fuel after purging is. Consequently, as shown in FIG. 8, about 10 percent to 20 percent for the ratio of volumes leads to a minimum amount of dispersed fuel for a predetermined period. This is true of the first embodiment.

While the invention has been described by reference to specific embodiments chosen for purposes of illustration, it should be apparent that numerous modifications can be made thereto by those skilled in the art without departing from the basic concept and scope of the invention.

We claim:

1. A canister comprising:

a casing having an interior therein;

a separator for separating said interior into first and second interior sections, said first interior section containing an absorbent and having a fuel vapor inlet and a fuel vapor outlet, said second interior section containing an absorbent and having an opening to outside air, said separator being formed of a flexible filtering material having a plurality of fuel vapor channels extending therethrough, wherein the flexible filtering material is compressed to elongate said fuel vapor channels.

2. A canister according to claim 1, wherein said flexible filtering material is non-woven fabric.

3. A canister according to claim 1, wherein said flexible filtering material consists of hollow fibers.

4. A canister according to claim 1, wherein said adsorbents are comprised of activated carbon.

5. A canister according to claim 1, wherein the ratio of the volume of said absorbent of said second interior section to the volume of said absorbent of said first interior section is determined to minimize the amount of fuel vapor dispersed to said outside air via said opening.

6. A canister according to claim 5, wherein said ratio is between about 10 percent and about 20 percent.

* * * * *